March 22, 1932.   T. L. COWLES   1,850,340

TRANSMISSION LUBRICATING MEANS

Filed April 23, 1931   2 Sheets-Sheet 1

INVENTOR.
Thomas L. Cowles
BY Pomeroy Colain
ATTORNEYS.

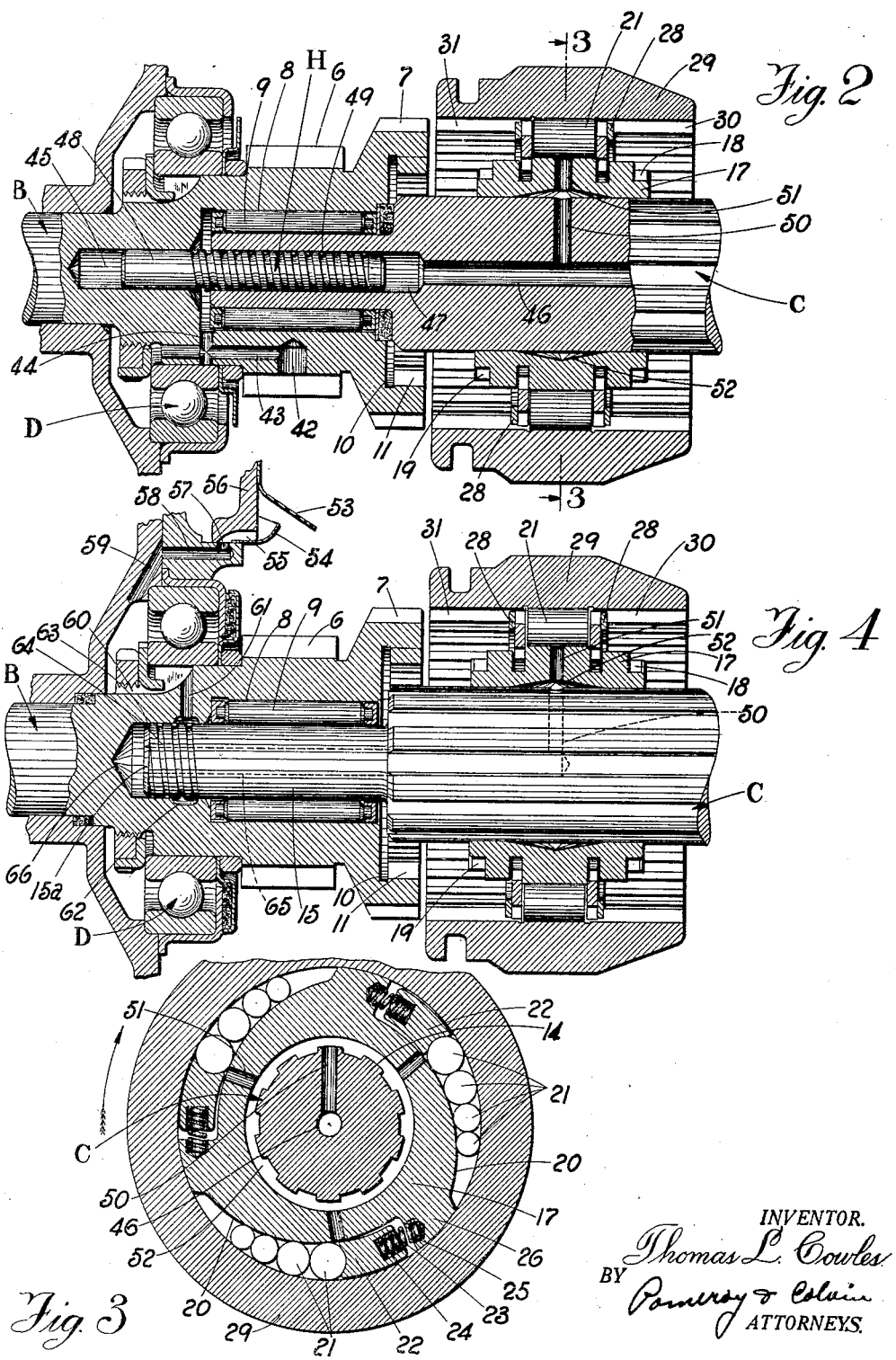

Patented Mar. 22, 1932

1,850,340

UNITED STATES PATENT OFFICE

THOMAS L. COWLES, OF SOUTH BEND, INDIANA, ASSIGNOR, BY MESNE ASSIGNMENTS, TO FREE WHEELING PATENTS CORPORATION, OF SOUTH BEND, INDIANA, A CORPORATION OF DELAWARE

TRANSMISSION LUBRICATING MEANS

Application filed April 23, 1931. Serial No. 532,199.

This invention relates to improvements in lubricating systems for variable speed transmissions and deals more specifically with means for lubricating the gear and clutch elements of an overrunning or free wheeling type of transmission. In an overrunning or free wheeling type of transmission, one or more one-way acting clutch structures are provided to permit the driven shaft to overrun under its own momentum relative to the drive shaft. In some transmissions of this type, independent clutch structures are provided for any desired number of different speed drives, while in others the clutch structures for two drives are combined in different ways to eliminate as far as possible some of the elements which are duplicated in structures embodying independent clutch elements. The actual use of overrunning transmissions as stock equipment in motor vehicles presents a new problem in transmission lubrication, and that problem requires particular consideration when independent clutch structures are used and especially when the clutch structures for two drives are combined as noted above. It has been found that the splash of lubricant in the transmission casing, usually relied upon to lubricate the gears of the various speed drives, is not sufficient to properly lubricate the clutch structures and particularly the combined types due to the extreme compactness of the same and also to the fact that some of the clutch elements are enclosed within a larger element which to a considerable extent shields the inside elements from the lubricant.

It is, therefore, a primary object of this invention to provide a system for lubricating the overrunning structure or structures and/or the gears of variable speed transmissions.

A further object of this invention is to provide a novel form of pump for forcing lubricant to the various parts of a variable speed transmission, said pump preferably being actuated by the normal operation of the transmission mechanism without the use of any intermediate transmission means or drive for the pump.

A still further object of the invention is the provision of a lubricant feeding pump for a transmission, which requires no separate casing or housing structure, said pump being built into the transmission mechanism so as to be housed thereby.

It is a further object of the invention to so modify certain standard parts of the transmission mechanism that these parts may be utilized to serve as part of the pump structure thereby eliminating the necessity of adding additional mechanical elements to the transmission mechanism.

Another object of the invention is to provide a lubricating system for transmissions which is of exceedingly simple construction, one which will operate without any special attention or consideration on the part of the owner of the vehicle equipped with the same and one which may be built into a transmission without material alteration of any of the elements of the latter.

Other objects and advantages of the invention will be apparent during the course of the following description:

In the accompanying drawings forming part of this specification and in which like numerals are employed to designate like parts throughout the same;

Figure 2 is a detailed view on a larger scale, showing certain important elements of the pump structure shown in Figure 1.

Figure 3 is a detailed transverse sectional view taken on the line 3—3 of Figure 1, showing the one-way acting clutch structure incorporated in the transmission illustrated in Figure 1.

Figure 4 is a detailed view similar to Figure 2 but showing a modification of the structure shown in Figure 2.

Figure 1:
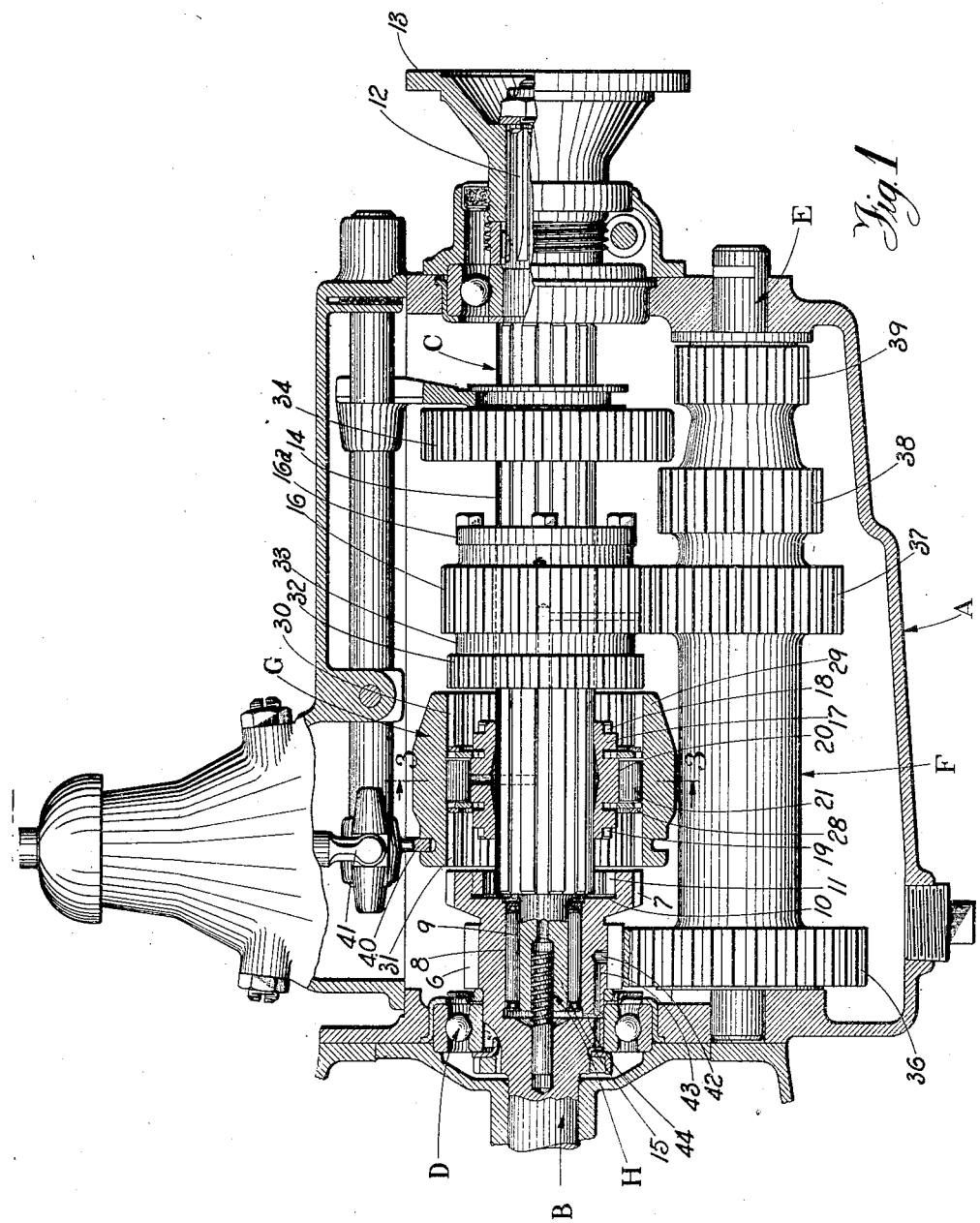
Figure 1 is a vertical longitudinal sectional view of a transmission, including an overrunning clutch structure for certain forward speed drives and a special lubricating system for said clutch structure and/or some of the gear elements.

Briefly describing the invention for the purpose of enabling those skilled in the art to readily understand the mode of operation of the invention; the same consists of a transmission casing or housing A, having suitably mounted therein a drive shaft B and a driven or transmission shaft C. These shafts B and C are arranged in axial alignment with each other and are telescopically associated at their adjacent ends and supported in the casing A through the medium of the anti-friction bearing structure D. A countershaft E mounted in the casing A has associated therewith a sleeve F which rotates relative the countershaft E and carries various gears included in the different speed drives.

A combined one-way acting clutch structure and drive connection G is provided for establishing connections for two different speed drives from the drive shaft B to the driven shaft C. This unit G permits the driven shaft to be driven by the drive shaft at two different forward speeds and also permits or prevents, at the will of the operator, the driven shaft to overrun under its own momentum, relative the drive shaft.

The various gears forming the different speed drives of a transmission usually are lubricated by the splash of lubricant caused by the relative rotation of the various gears. It has been determined that the clutch structures incorporated in an over-running clutch type of transmission do not receive sufficient lubrication if the ordinary splash method alone is relied upon. For this reason, a force feed pump structure H is provided for feeding lubricant through a system of passages to the clutch structure or structures. This system of passageways, if desired, may include one or more of the sets of gears forming a part of the different speed drives.

The invention now will be described in detail for affording a complete understanding of all the various elements, features of construction and mode of operation.

The transmission casing or housing A may take any desired form and is designed to permit the drive shaft B to project into the interior of the same at one end thereof. The outer end of this drive shaft is intended to be connected to an engine or prime mover of any suitable form and preferably through a controllable clutch structure not shown. The inner end of the drive shaft B is supported by the anti-friction bearing structure D and has formed thereon a gear 6. Inwardly of the gear 6, the drive shaft B is increased in diameter and has formed on its periphery a set of clutch teeth 7. The portion of the drive shaft B having formed thereon the gear 6 and the clutch teeth 7, is hollowed out to provide a bearing receiving pocket 8, within which an anti-friction bearing structure 9 is positioned. This hollowed out portion 8 of the drive shaft is increased in diameter, as at 10, to form a concentric enlargement of the hollowed-out portion. An annular set of clutch teeth 11 is formed on the inner wall of this portion 10 and in radial alignment with the set of clutch teeth 7.

The driven shaft C projects through the rear end of the gear casing or housing A in axial alignment with the drive shaft B. The outer end 12 of this driven shaft is adapted to have suitably secured thereto a driving collar or flange 13 for connection with the element or elements to be driven from the transmission, such as the rear wheels of a motor vehicle. The intermediate portion of the driven shaft C is splined as at 14, and this spline formation extends substantially the full length of the same, except that portion thereof on which the gear 16 is rotatably mounted. The inner extremity of the driven shaft is reduced in diameter at 15 for entering the anti-friction bearing structure 9, mounted in the recessed portion 8 of the drive shaft B. This telescopic arrangement of the adjacent ends of the drive and driven shafts permits the same to support each other through the medium of the anti-friction bearing 9 for maintaining relative axial alignment and for permitting relative rotation.

The gear 16 is mounted upon the driven shaft C and is supported by the latter in a manner to permit relative rotation thereon. On one side of this gear is an element 16ª which is adapted to prevent axial movement of the gear upon the shaft. Any suitable means for mounting the gear to permit free rotation of the gear about the shaft and at the same time prevent axial motion of the gear relative to the shaft, may be employed.

Splined upon the driven shaft between the end of the drive shaft and the gear 16 and axially movable upon the driven shaft, is an inner sleeve 17, the opposite ends of which are formed with sets of clutch teeth 18 and 19, adapted to engage, in certain operative positions of the inner sleeve 17, with clutch teeth formed interiorly of the extension 33 of the gear 16, or with the set of clutch teeth 11 formed on the drive shaft B respectively. Intermediate these sets of clutch teeth, the inner sleeve 17 is formed with a plurality of cam surfaces 20 which are preferably equi-spaced around the periphery of the inner sleeve 17, each having associated therewith a plurality of wedging rollers 21 which progressively vary in diameter. At one end of each set of rollers 21, a follower 22 is provided which is urged toward its rollers by means of a spring 23.

An outer sleeve 29 surrounds the inner sleeve 17 with its various sets of rollers 21 and followers 22, and is formed at its opposite ends with sets of clutch teeth 30 and 31. The clutch teeth 30 are designed to cooperate with a set of clutch teeth 32 formed on an integral enlarged portion 33 of the gear 16, and the set of clutch teeth 31 is adapted to associate with the set of clutch teeth 7 formed on the drive shaft B. For a more complete description of the construction and operation of this device, attention is directed to copending application of Delmar G. Roos and H. E. Churchill, Serial No. 502,942, filed Dec. 17, 1930, or the copending application of Harry F. Bushong, Serial No. 528,586, filed Apr. 8, 1931.

A shiftable gear 34 is supported on the driven shaft C and is splined thereto for effecting first and reverse speed.

The countershaft E has rotatably positioned thereupon a sleeve F for carrying a gear 36 constantly meshing with the gear 6 formed on the drive shaft B. A gear 37 is carried by the sleeve F and constantly meshes with the gear 16 rotatably supported upon the driven shaft C. Gears 38 and 39 are also carried by the sleeve F. The shiftable gear 34 on the driven shaft is adapted for movement into mesh with the gear 38, or with an idler pinion not illustrated, which meshes with the gear 39, for producing first and reverse speed drives respectively.

In variable speed transmissions the various sets of driving gears normally are lubricated by being submerged in a bath of lubricant contained in the housing A. The relative motion of the gears sets up a splashing action which thoroughly distributes the lubricant and lubricates all the gears. It has been found that this normal splash of lubricant may not be sufficient to lubricate the elements of the overrunning clutch structure and for this reason a force feed is desirable.

In the present case in the preferred form as illustrated in Figures 1 and 2, this force feed consists of a pump that comprises the elements and mode of operation as follows:

The gear wheel 6 has one or more recesses 42 therein situated between the gear teeth. As the gear 6 is continually in mesh with the gear 36 during rotation, the gear 36 will pick up lubricant from the lower part of the gear housing A and carry it upwardly to the gear 6. As the teeth on the gear 36 mesh with the teeth on the gear 6, this lubricant will be forced into the recess 42. Connected with the recess 42 and extending axially of the gear 6 toward the front thereof, is a bore or channel 43 which communicates with a transverse bore or channel 44 that leads into the recessed inner portion 8 of the gear 6. As shown in Figure 2, these channels extend through the outer portion of the gear, but the ends near the outer portions of the gear are plugged to form a channel from the recess 42 into the forward end of the recess 8 in the gear 6. In the forward portion of the recess 8 and centrally of said recess, a hole 45 is drilled that extends into the shaft B. The forward end of the driven shaft C is provided with a central bore or channel 46 that extends rearwardly beyond the transverse axis of the member 17, and may extend, as shown in Figure 1, to a point medially of the gear 16. The forward end of this central bore is enlarged, as at 47, the enlarged portion extending from the forward end of the shaft C to a point somewhat rearwardly of the reduced end of the shaft. This enlarged portion has the same diameter as the hole 45 provided in the shaft B. Fixedly supported in the hole 45 and extending into the enlargement 47 of the central bore 46, is a pin member 48. That portion of the member 48 which extends into the shaft C is provided with a spiral screw thread 49. From an inspection of this structure, it will be observed that the lubricant forced through the channel 44 into the forward end of the recess 8, will now be picked up by the screw thread 49 of the pin member 48 and due to the relative motion between the shafts B and C, the lubricant will be forced by said screw threads into the central bore 46 provided in the shaft C. From the central bore 46, a transverse bore 50 leads to the surface of the shaft C at the central portion of the member 17. A continuation 51 of the transverse bore 50 is provided in the member 17 so that the lubricant may pass therethrough to the rollers 21 of the overrunning clutch mechanism. In the inner surface of the member 17, there is provided a tapered recess 52 surrounding the bore 51, the recess being of sufficient dimensions so that the shifting of the member 17 upon the shaft C to accomplish the various gear operations will not be effective to close the outer end of the bore 50.

It will also be noted that the combined length of the bores 50 and 51 is greater than the radius of the pin 48 whereby centrifugal force produced by rotation of the shaft C and the member 17 will tend to throw the lubricant out of the bores 50 and 51, thereby creating a suction in the central bore 46 which will tend to aid in drawing the lubricant into the pumping element 49. From the rollers 21 in the overrunning clutch mechanism, the lubricant will flow across the inner surface of the member 29 and from the edge of the member 29, it will be thrown back into the transmission housing from where it may again be picked up by the gear 36.

In the modification shown in Figure 4, a baffle 53 is secured to the inner wall of the transmission cover 56 above the gear 6. Below the inner portion of the baffle 53 is provided a trough member 54, from the lower part of which a bore 55 is cut in the lower part of the cover 56 of the transmission housing. This bore leads through a short vertical well 57 into a bore 58 drilled in another part of the transmission housing, and the bore 58 leads into a bore 59 drilled in the flange member surrounding the anti-friction bearing D. Between this flange member and the anti-friction bearing, there is a space which serves as a reservoir for the lubricant. A channel 60 is cut in the shaft B, the forward end of the channel communicating with the reservoir about the anti-friction bearing D, the channel leading past a part of the anti-friction bearing and communicating at its rear end with a transverse bore 61 drilled in the shaft B. The inner end of the bore 61 communicates with a groove 62 provided in the central recess 63 in the shaft B. The recess 63 is a forward extension of the recess 8 provided in the gear 6 to telescopically receive the reduced end 15 of the shaft C. The recess 8 is larger than the reduced portion 15 of the shaft C and the anti-friction rollers 9 are inserted between the reduced end of the shaft C and the inner surface of the recess 8. The extension 63 of the recess 8 is of the same diameter as the reduced portion 15 of the shaft C and an extension 15ª of the shaft C is inserted in the extension 63 of the recess 8. The extension 15ª is provided with screw threads 64. The shaft C is provided with a central bore 65 which extends from the forward end thereof to a point slightly beyond the transverse axis of the member 17. A transverse bore 50 communicates with the central bore at one end and with the surface of the shaft C centrally of the member 17. An extension 51 of the bore 50 is provided through the member 17. The member 17 has a tapered recess 52 surrounding the inner end of the bore 50 so that sliding of the member 17 relative to the shaft C during shifting will not be effective to close the end of the bore 50.

The operation of this device is as follows: The lubricant is thrown by the gear 6 against the baffle 53 which directs the lubricant into the trough 54 from where it flows through the channels 55, 57, 58 and 59 to the reservoir surrounding the bearing D. From this reservoir the lubricant flows through the channels 60 and 61 into the groove 62, where it is picked up by the screw threads 64 on the forward end of the shaft C and forced into a space 66 between the forward wall of the recess 63 and the forward end of the shaft C. From this space the lubricant flows through the central bore 65, in the shaft C to the transverse bore 50 from whence it flows through the transverse bore 50 and the extension 51 to the roller members 21 of the overrunning clutch member. It flows from these rollers 21 and is thrown by the edge of the member 29 back into the transmission housing, from where it is again picked up by the gears 36 and 6 and thrown against the baffle 53.

It will be observed that the combined lengths of the bores 50 and 51 are greater than the length of the bore 61, so that owing to centrifugal forces due to the rotation of shafts B and C, the lubricant will be thrown outwardly from the bore 51 which will create a partial vacuum in the bore 65 which tends to draw in the lubricant through the bore 61.

It will be noted that the pump will function whenever the drive and driven shafts are rotating relative to each other, so that whenever the overrunning clutch may function, lubricant is pumped thereto. This relative rotation occurs at all times during the second or intermediate speed drives and occurs during direct drive when the driven shaft is overrunning, under its own momentum relative to the drive shaft. The one-way acting clutch structure, therefore, will be supplied with lubricant whenever it is functioning during either the second or high speed drives.

It is to be understood that the form of this invention herewith shown and described is to be taken as a preferred example of the same and that various changes in the shape, size and arrangement of parts may be resorted to without departing from the spirit of the invention and the scope of the sub-joined claims.

What I claim is:

1. In a device of the type described, a pair of relatively rotatable aligned shafts, one of said shafts being provided with an axial bore, and a lubrication pump operative upon relative rotation of said shafts, said lubrication pump comprising, a screw threaded member fixed upon the other of said shafts and extending into the bore in said one shaft.

2. In a device of the type described, an oil reservoir, a part to be oiled, a pair of relatively rotatably aligned shafts, one of said shafts being provided with an axial bore in one end thereof, and an oil pump operative upon relative rotation of said shafts to pump oil from said reservoir to said part, said oil pump comprising, a screw threaded member fixed upon the other of said shafts and extending into the bore in said one shaft.

3. In a device of the type described, a pair of relatively rotatable aligned shafts, an overrunning clutch mechanism on one of said shafts and operatively engageable with the other of said shafts to provide a one-way driving connection between said shafts, and a screw threaded element operating upon relative rotation of said shafts to force lubricant into said overrunning clutch mechanism.

4. In a device of the type described, a pair of relatively rotatable aligned shafts, an overrunning clutch mechanism mounted on one of said shafts and operatively engageable with the other of said shafts for driving said one shaft from said other shaft at various speeds in one direction and for permitting overrun of said one shaft under its own momentum relative to said other shaft, and a screw threaded element fixed on one of said shafts extending into the other of said shafts operative upon relative rotation of said shafts to force lubricant into said overrunning clutch mechanism.

5. In combination with a variable speed transmission comprising, a drive shaft and a driven shaft in axial alignment with each other, an overrunning clutch mechanism mounted on the driven shaft for driving said driven shaft from said drive shaft at various speeds in one direction and for permitting said driven shaft to overrun said drive shaft under its own momentum, a lubrication pump mounted between the juxtaposed ends of the drive and driven shafts, said pump comprising, a screw threaded member having one end fixed concentrically in said drive shaft and the other end extending into a concentric bore in said driven shaft for forcing lubricant into said overrunning clutch mechanism.

6. In combination with a variable speed transmission comprising, a drive shaft and a driven shaft in axial alignment and rotatable relative to each other, and an overrunning clutch mechanism mounted on said driven shaft and operatively connected to said drive shaft to provide a one-way driving connection between said shafts, said driven shaft having an axial bore extending from the front end thereof to the overrunning clutch mechanism, of a pump for supplying lubricant to said overrunning clutch mechanism comprising, a member extending concentrically from said drive shaft having a portion thereof extending into the bore of said driven shaft, the portion of said member extending into said bore being provided with spiral grooves for forcing lubricant through said bore to said overrunning clutch mechanism.

7. In a vehicle transmission, a drive shaft having a gear upon one end thereof, a recess interiorly of said gear, and channels between said recess and said gear, a driven shaft having a reduced end mounted in said recess; an overrunning clutch mechanism mounted on said driven shaft and operatively engageable with said drive shaft to provide a one-way driving connection between said shafts, said driven shaft being formed with channels leading from the exterior of its reduced end to said overrunning clutch, and a screw threaded member fixed in said drive shaft and rotatably received in said driven shaft whereby relative rotation of said shafts will cause said screw threaded member to force lubricant through said driven shaft to said overrunning clutch.

8. In a variable speed transmission, a drive shaft having a recess formed in the end thereof and a channel leading from the exterior of said shaft into said recess; a driven shaft having a reduced end telescopically insertable in said recess in said drive shaft; an overrunning clutch mechanism mounted on said driven shaft and operatively engageable with said drive shaft to provide a one-way driving connection between said shafts, said driven shaft being provided with an axial bore and a transverse bore extending from the extremity of said reduced end to said overrunning clutch mechanism; and spiral threads upon said reduced end for forcing lubricant through said bore to said overrunning clutch mechanism.

9. In a variable speed transmission, a transmission casing; a drive shaft mounted in said casing having a gear upon the end thereof, a recess interiorly of said gear, and a transverse bore extending from the exterior of said shaft into said recess; a driven shaft mounted in said casing having a reduced end telescopically received in said recess in said drive shaft; an overrunning clutch mechanism mounted upon said driven shaft operatively engageable with said drive shaft to provide a one-way driving connection between said shafts, said driven shaft being formed with an axial and a transverse bore leading from the extremity of its reduced end to said overrunning clutch mechanism, said casing being formed with channels communicating with the bore in said drive shaft; a baffle mounted on said casing for directing lubricant into said channels; and spiral threads upon the reduced end of said driven shaft for forcing lubricant through said driven shaft to said overrunning clutch mechanism.

Signed by me at South Bend, Indiana, this 20th day of April, 1931.

THOMAS L. COWLES.